A. H. NEULAND.
ELECTROMAGNETIC POWER TRANSMITTING APPARATUS.
APPLICATION FILED AUG. 8, 1914.

1,298,375.

Patented Mar. 25, 1919.
4 SHEETS—SHEET 1.

WITNESSES:

INVENTOR.
A. H. NEULAND
BY Miller & White
his ATTORNEYS.

A. H. NEULAND.
ELECTROMAGNETIC POWER TRANSMITTING APPARATUS.
APPLICATION FILED AUG. 8, 1914.

1,298,375.

Patented Mar. 25, 1919.
4 SHEETS—SHEET 3.

WITNESSES:

INVENTOR.
A. H. NEULAND
BY Miller & White
his ATTORNEYS.

UNITED STATES PATENT OFFICE.

ALFONS H. NEULAND, OF SAN FRANCISCO, CALIFORNIA.

ELECTROMAGNETIC POWER-TRANSMITTING APPARATUS.

1,298,375.   Specification of Letters Patent.   Patented Mar. 25, 1919.

Application filed August 8, 1914.   Serial No. 855,873.

*To all whom it may concern:*

Be it known that I, ALFONS H. NEULAND, a subject of the Czar of Russia, and a resident of the city and county of San Francisco, State of California, have invented certain new and useful Improvements in Electromagnetic Power-Transmitting Apparatus, of which the following is a specification.

The invention relates to power transmitting apparatus and particularly to such apparatus of the electromagnetic type, which is adapted to transmit power from one rotatable element to another, as from one shaft to another.

An object of my invention is to provide a power transmitting apparatus in which the driven member may rotate at a different angular velocity than the driving member and in which the speed of the driven member may be varied with relation to the speed of the driving member. The speed of the driving member may be maintained constant at the most efficient speed of the prime mover and the speed of the driven element may be varied from zero to synchronism with the driving element or above the speed of the driving element, and this may be accomplished without the dissipation of energy in external resistances and the like.

Another object of the invention is to provide a power transmitting apparatus in which not only the speed of the driven element may be varied with relation to the speed of the driving element, but in which the direction of rotation of the driven element may be reversed with relation to the direction of rotation of the driving element, and this may also be accomplished simply and without the external dissipation of energy.

Another object of the invention is to provide a power transmitting apparatus in which the driven element is rotatable at an adjustable fixed speed at all loads for a constant speed of the driving element, that is, the speed of the driven member may be adjusted to any angular velocity, and such velocity will remain constant independent of variations of the load.

The invention possesses other advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form because my invention may be embodied in a multiplicity of forms, each being a species of my said invention. It is also to be understood that by the claims succeeding the description of my invention, I desire to cover the invention in whatever form it may be embodied.

Generally speaking, my invention consists in one of its phases, in producing a torque between an armature and a field element and allowing the torque to move the field element either in the same or in the opposite direction to the armature. The armature is connected to the driving shaft, and the field element is connected to the other shaft.

The torque and slip in one form of the present apparatus are dependent on the strength of the field, the current in the armature and the power factor of the armature current, and a variation in the torque and slip is obtained by either varying the field current, or by varying the resistances of the armature circuit, or by both.

The field flux in the field element is produced by the magnetizing coil, which may in some cases surround the field element, and in other cases may be arranged otherwise adjacent the field element. With the armature rotating and the armature circuits closed through a variable resistance or short circuited, a torque is produced between the field element and the armature by reason of their inductive relation. In order to produce a high starting torque a sufficient external resistance must be inserted in the armature circuit to consume the entire energy generated therein. This causes the efficiency of the machine at start and at low speeds to be low. A much higher efficiency and a greater starting torque is obtained by introducing the armature current, which would otherwise be consumed in the external resistances, into a winding arranged on the stator, and for this purpose the armature has been provided with a commutator and brushes. The leads from the stator winding are so connected to the brushes that the direct currents collected at the brushes when the field element is stationary will traverse the stator windings in such a way, that a flux will be produced which produces a torque between the stator and the field element which adds itself to the torque resulting from the reaction between the field and the current in the armature. As the driven member begins to rotate the field progresses in the direction of the armature rotation and the neutral point on the commutator rotates at the same angular velocity as the field and produces polyphase currents at the brushes. These polyphase currents circulate through the windings of the stator and create a revolving field, the angular velocity of which equals the angular velocity of the field due to the rotation of the driven or field element, and these two fields have quadrature relation at standstill of the driven or field element and retain this relation at all speeds of said element. Further, the generated potential in the constant speed armature is highest when the field is stationary, and as the driven element begins to rotate, allowing the field to follow, the armature potential is proportionately decreased. Furthermore, a counter electromotive force is generated in the stator winding, due to the progression of the flux in the stator which opposes the armature potential and again lowers the resultant potential, thus limiting the current in the windings until a point in the speed is reached where the counter E. M. F. due to the stator windings equals that generated in the armature. When the turns on the armature equal the turns on the stator this point is reached at a slip of substantially fifty per cent. The winding on the stator is so arranged that portions thereof may be cut out, thereby decreasing the counter E. M. F. and allowing an increase of current, consequently enabling the speed to increase. In this way a number of speeds are obtained above which the speed of the driven element cannot rise even though it were free from any load. An adjustment of the speed, between the steps obtained by varying the turns of the winding, is obtained by inserting a variable resistance between the armature and stator windings, and this resistance is employed only when speeds intermediate the steps are desired.

Reversal of direction of rotation of the driven element without reversing the direction of rotation of the driving element is accomplished in several ways. One method consists in having the field element divided into two members, rotatable independent of each other and so constructed and arranged that the torque produced between the field element and the armature current tends to rotate one member in one direction and the other member in the opposite direction. Another method of reversal consists in reversing or changing the stator winding with relation to the commutator brushes, so that a torque in opposition to that produced by the armature is produced. In the latter method of reversal, notwithstanding the fact that the torque produced by the armature current is in opposition to the torque produced by the stator winding, the torque produced by the stator winding in the opposite direction predominates by reason of the large number of ampere turns therein as compared with those of the armature. The only energy at start required by the stator winding to produce this opposing torque is that which is sufficient to overcome the resistance of the winding. Since the current in the armature to furnish this energy is comparatively small, the ampere turns are proportionately small, consequently the armature torque is smaller than the torque produced by the stator windings, and therefore the torque produced by the stator windings upon the field element predominates. Where reversal is obtained by the last described means, the field element may consist of a single member.

In the drawings accompanying and forming part of the present specification.

I shall first describe in detail the construction of the apparatus shown in Figs. 1–8 inclusive, which specific embodiment forms the subject of divisional application, Serial No. 166,136, filed May 3, 1917. In this embodiment of the invention the apparatus comprises a frame or stator 2, on which is arranged the laminated stator element 3, which is annular in shape and which is preferably provided with a plurality of semi-closed slots 4, for receiving the coils 5 of the stator winding. Arranged within the stator and concentrically disposed with relation thereto is the laminated armature element 6 which is annular in form and which is mounted on the hub 7 secured to the shaft 8. The armature element is preferably provided with a plurality of semi-closed slots 9 in which the coils 12 of the armature winding are embedded.

Figure 1:
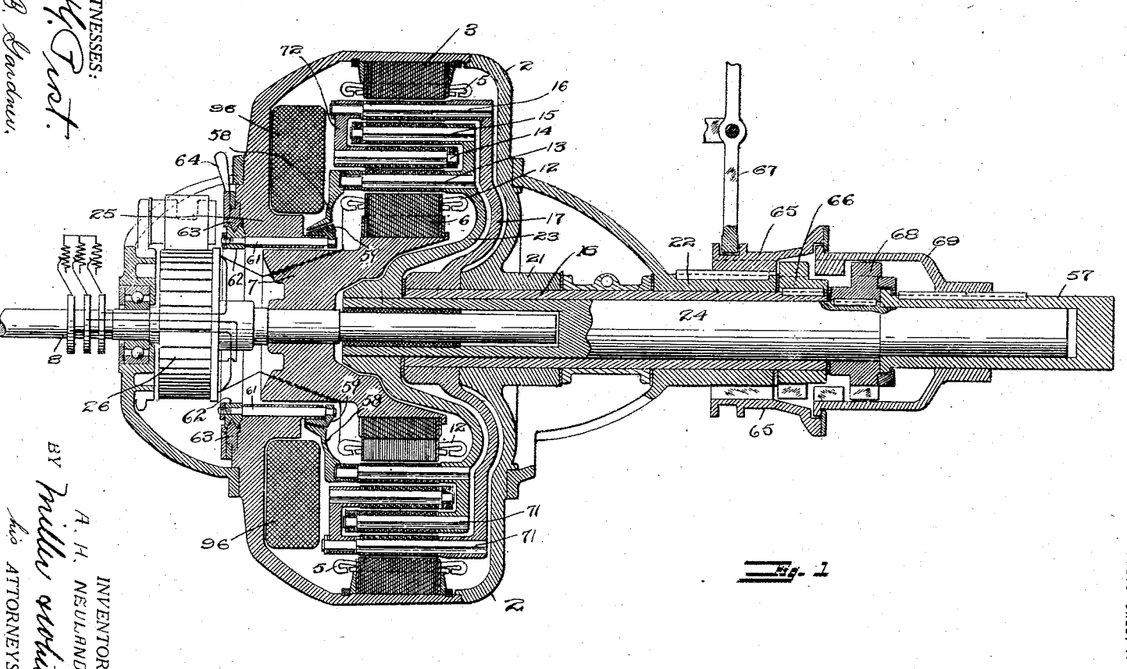
Figure 1 is a longitudinal section of one embodiment of my invention.
Figure 2:
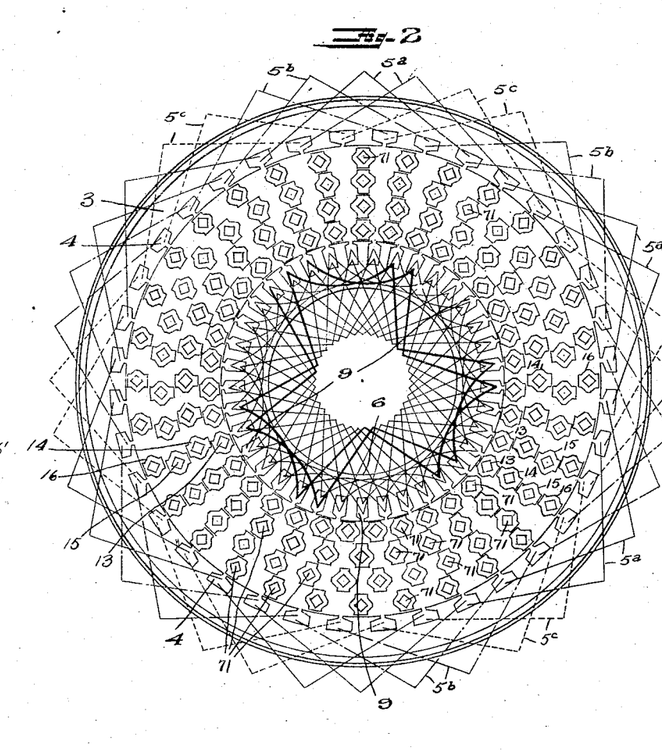
Fig. 2 is a cross-section of the machine shown in Fig. 1, the armature and stator windings being shown diagrammatically.

Arranged between the stator element and the armature element and concentric therewith is a field element which in the present construction consists of two members, each comprising two concentric series 13—15 and 14—16 of laminated bars, the bars being arranged parallel to the axis of the machine. The alternate series of bars 14 and 16 are mounted on a spider 17 which is secured to the sleeve or hollow shaft 18 journaled in the bearings 21 and 22 on the frame 2. The series of bars 13 and 15 are mounted on a spider 23 which is secured to the shaft 24 journaled in a hollow shaft 18. The shaft 24 is formed hollow at its inner end to provide a bearing for the armature shaft 8.

Means are provided for locking either or both field members against rotation, or for allowing either member to rotate, as will be hereinafter set forth, it being sufficient at this time to state that either member, that is, bar series 13—15 or 14—16, may be locked against movement and the other member allowed to rotate.

The hub 7 which carries the armature element 6 extends into a cylindrical projection 25 on the frame. Mounted on the cylindrical projection is the magnetizing coil 96, the magnetic circuit of which includes the frame, the projection 25, the hub 7, the armature element 6, the field members 13, 14, 15, and 16 and the stator element 3. The number of bars in the various series 13—14—15—16 is so proportioned that the bars are alined at certain portions and non-alined or staggered at intermediate portions, and the magnetic flux passes principally through those portions of the machine at which the bars are alined.

In the present construction each series 13—15 contains thirty-five equally spaced bars, and each series 14—16 contains thirty-two equally spaced bars. This arrangement produces three portions of alined bars spaced apart 120° and three intermediate portions of non-alined bars, producing a six-pole machine. The armature is provided with a winding which is wound for twice the number of poles as there are alined portions or for six poles, and the windings are connected to the commutator 26 which is secured to the shaft 8 in any well-known manner.

It is seen that if either of the field members 13—15 or 14—16 is rotated and the other held stationary that the alined portions or poles rotate at a greater angular velocity than the field member, that is, for the rotation of a field member through the angular distance between two successive bars, the alined portion rotates 120° so that the field has a much higher angular velocity than the field member, and conversely, the field member has a lower angular velocity than the field. The direction of rotation of the field with respect to the direction of rotation of the field member depends upon which field member is rotated. If the field member 13—15 is rotated the direction of rotation of the field is the same as that of the member, and if field member 14—16 is rotated the direction of rotation is in opposition to that of the member. This is caused by the difference in the angular pitch of bars in the series of the different members. The relation between the angular velocity of the field and the field member is the ratio between the number of bars in one series of the field member to the number of alined portions, that is, in the present instance, the relation of the angular velocity of the field member 13—15 to the field is as 3 to 35, and the relation of the angular velocity of the field member 14—16 to the field is as 3 to 32.

With a current flowing in the magnetizing winding, the armature rotated, and its circuits short circuited or closed through external resistances a torque reaction is produced between the armature and the field members, that is, the field has a tendency to follow the armature. If the inner field member 13—15 is released and allowed to rotate the field will follow the armature and strive to attain synchronism, resulting in rotation of the field member 13—15 in the direction of the rotating field and armature, but at a much lower angular velocity, the angular velocity of the field member 13—15 at synchronism being three thirty-fifths of the angular velocity of the armature. If the inner field member 13—15 is locked in position and the outer field member 14—16 released, the field will again follow the armature and strive to reach synchronism, which will result in an angular velocity of the field member of three thirty-seconds of the angular velocity of the armature when the field reaches synchronism with the armature. The direction of rotation of the field member 14—16 is in opposition to that of the armature, however, for reasons which have hereintofore been set forth. It is evident, therefore, that if the field member 13—15 is connected to a driven shaft and the field member 14—16 held stationary that such driven shaft will be rotated in the same direction as the armature, but at a lower speed, and if the field member 14—16 is connected to the driven shaft and the field member 13—15 held stationary, that the driven shaft will rotate in the opposite direction from the armature and at a lower speed.

The armature is provided with a series winding and is wound for twice as many poles as there are alined portions in the field element, and means are provided for varying the resistance of the armature circuits so that a varying relation between the speed of the armature and the driven shaft may be obtained. This may be accomplished by arranging slip rings on the shaft 8 and inserting a variable resistance in the external circuit between the brushes which contact with the slip rings, as shown in Fig. 1. For reasons which will hereafter become evident in the description of the complete embodiment of the invention, a commutator 26 will usually be used instead of the slip rings, but when the stator windings are not employed, the slip rings may be used instead of the commutator. By varying the resistance of the armature circuits the speed of the field member may be varied from near synchronism to zero and to near synchronism in the opposite direction without varying the speed of or stopping the rotation of the armature, and the maximum torque over the entire range from zero speed to near synchronism is thus maintained. In this construction, in which the stator is not included, instead of employing slip rings and short circuiting the armature windings, the armature may be provided with a squirrel cage winding.

A construction which excludes the stator windings, contemplates the dissipation of the armature currents in external resistances or short circuits, and this construction is applicable to conditions where a particularly high torque at start and at low speeds is not essential. A much higher efficiency and a greater starting and low speed torque, however, is obtained by introducing the armature current into the stator windings, which are arranged in such a way that the torque produced by the current in the stator windings adds itself to the torque resulting from the reaction between the field and the armature current. For the purpose of commutating the currents generated in the armature, so that they may be conducted to the stator windings, the commutator 26 is employed, and the armature coils are connected to the commutator in any usual manner. Contacting with the commutator are stationary brushes 31—32—33, the brushes being so arranged that polyphase currents can be collected from them by rotating the field and holding the armature stationary. Assuming the brushes belonging to each phase short-circuited or closed through a resistance, the magnetizing coil energized and the field element held stationary, rotation of the armature will induce currents in its windings which will appear as direct currents in the resistances connected to those brushes which have a neutral position with respect to the field poles. The other brushes closed through their respective resistance will also carry a direct current, but of lesser intensity, depending upon the position they occupy on the commutator. If the field element is released and the field allowed to rotate, this neutral position progresses at a corresponding angular velocity. Thus, as the neutral position passes the brushes belonging to the various phases, an alternating polyphase current is flowing in the resistances connecting them. The brushes are connected to the stator windings, so that the polyphase currents collected are introduced into the stator windings. This winding is arranged for as many poles as the winding on the armature and connected for as many phases as obtain in the currents collected from the commutator brushes. In the present embodiment, Fig. 2, I have shown a three phase stator winding, the coils 5$^a$ (in full lines) belonging to one phase; the coils 5$^b$ (in dot and dash lines) belonging to the second phase; and the coils 5$^c$ (in dotted lines) belonging to the third phase. The leads 41—42—43—44—45—46—47—48—49—50—51—52 are so connected to the brushes 31—32—33 that the currents collected will traverse the stator windings in such a way that the flux produced thereby produces a torque which adds itself to the torque resulting from the reaction between the field and the armature current. The polyphase currents collected at the brushes circulate through the stator windings and create a revolving field having the same angular velocity as the field member. The fields of the stator and armature have quadrature relation at standstill of the field member and retain this relation at all speeds of the field member and maintain a torque as long as the armature E. M. F. predominates over the stator E. M. F. The direction of rotation of the driven shaft is dependent as has been heretofore explained, upon which field member 13—15 or 14—16 is connected to the driven shaft.

Figures 3, 4, 5, 6, 7, 8:
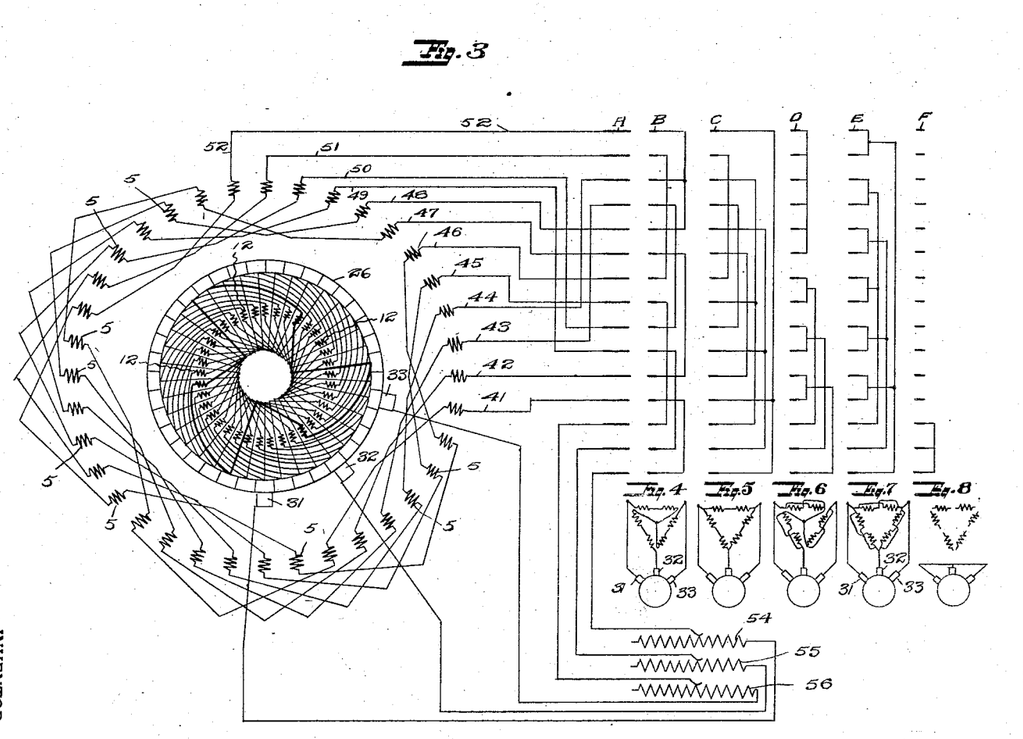
Fig. 3 is a diagrammatic representation of the electric circuits of the machine, including contacts of a controlling device.
Fig. 4 is a continuation of Fig. 3 showing one form of connecting the circuits at the controlling device, and a diagrammatic representation of the resultant connections.
Figs. 5, 6, 7 and 8 are other continuations of Fig. 3, showing various connections of the electric circuits and diagrammatic representations of these connections.

I have stated hereinbefore that the speed of rotation of the field member with relation to the speed of rotation of the armature may be varied by varying the arrangement of the stator windings. This may be accomplished by arranging a controlling device in the circuits between the brushes and the stator windings, and this controlling device I have diagrammatically illustrated in Figs. 4 to 8 inclusive. The leads 41 to 52 inclusive, of the stator windings, terminate at contacts A of the controlling device and the circuits from these leads to the brushes 31—32—33 are completed through either of the contacts B—C—D—E—F of the controlling device, which contacts are connected in different ways, so that the circuits of the stator windings may be varied. In Figs. 4 to 8 inclusive, I have shown five different steps or arrangements of contacts in the controlling apparatus, together with diagrams illustrating the connections effected by the different steps. Different steps in speed are obtained by varying the number of turns in series in the stator winding. The winding of each phase in the illustrated form is divided into two parts and to obtain the largest number of turns in series across the brushes, both parts of each phase are connected in series, and the windings of the three phases are connected in star fashion as shown in Fig. 4. This method of connection produces the lower speed of the driven element.

The second step in the speed variation is shown in Fig. 5, in which there is a fewer number of turns in series across the brushes. This is produced by connecting the three phases in delta, leaving the two parts of each phase still in series. The third step, with a still fewer number of turns in series, is shown in Fig. 6, in which the two parts of each phase are connected in multiple and the resultant windings of the three phases in star fashion. The fourth step, with a still fewer number of turns in series is shown in Fig. 7, in which the multiple windings of the three phases are connected in delta fashion. The fifth step, or maximum speed and low torque step, is shown in Fig. 8, in which all of the stator windings are open circuited and the brush leads closed. The lower speed is obtained with the form of connection shown in Fig. 4 and the speed is increased as the connections shown in Figs. 5 to 8 inclusive are made, the speed of the driven element when the connections of Fig. 8 are employed being near synchronism, or in the present embodiment near either three thirty-fifths, or three thirty-seconds of the speed of the armature, depending on the relative direction of rotation of the driven element and the armature.

In order to obtain variations of the speed, between the speed steps obtained by varying the stator winding connections, variable resistances 54—55—56 are included between the brush leads and the stator winding, and by increasing the variable resistance the speed is lowered and vice versa.

Speed regulation of the driven or field element may be obtained by other suitable means for changing the relative armature and stator potential, such as a transformer or auto-transformer, in which case the winding on the stator need not be changed. The application of this method in its various forms will suggest itself to those familiar with the art and requires no detailed description herein.

I have stated hereinbefore that either or both field members 13—15 and 14—16 may be locked against rotation or that either member may be connected to the driven shaft 57 and the other member held stationary. The field member 13—15 is provided with a flange 58 which is preferably secured to the series of bars 13. The inner face of the flange 58 is inclined, and disposed in close relation thereto is an annular wedge 59 having an inclined face corresponding to the inclination of the face of the flange. The wedge is movable axially into and out of engagement with the flange 58, and when in engagement, prevents the flange and consequently the field member 13—15 from rotating. The wedge 59 is supported on bolts 61 which are longitudinally slidable in the frame 2 and which are secured at their outer ends to the screw threaded ring 62. Engaging the ring 62 is a nut 63 which is capable of rotational movement only, being provided for that purpose with suitable means, such as the handle 64. It is seen that as the nut is rotated, the ring 62 and wedge 59 are moved axially, so that the wedge may be readily moved to lock or release the field member 13—15.

Splined to the bearing 22 is a sleeve 65 which is provided on its inner face with a plurality of slots which are adapted to be engaged by teeth or projections on the outer face of the clutch member 66 which is secured to the hollow shaft 18 to which the field member 14—16 is secured. The sleeve 65 is movable longitudinally by suitable means, such as the lever 67 and when moved into engagement with clutch member 66 locks the field member 14—16 against rotation.

The shaft 24, to which the field member 13—15 is secured, projects beyond the end of the hollow shaft 18 and extends into and supports the driven shaft 57. Secured to shaft 24 between shafts 18 and 57 is an externally toothed clutch member 68. Splined to shaft 57 and engaging sleeve 65 is a sleeve member 69 which is provided on its face with a plurality of slots which are adapted to be engaged by the teeth on clutch members 66 and 68 respectively. The sleeve 69 is rotatable independent of sleeve 65 but is movable longitudinally therewith. When sleeve 65 is moved longitudinally into engagement with clutch member 66, thereby locking field member 14—16, sleeve 69 is moved into engagement with clutch member 68, connecting the field member 13—15 with the driven shaft 57. When the sleeve 65 is moved in the opposite direction, sleeve 69 is moved into engagement with clutch member 66, connecting the field member 14—16 with the driven shaft 57. The field member 13—15 is locked against rotation by the wedge 59.

The bars in the series 13—14—15—16 are each composed of a bolt 71, preferably square in cross section, upon which the laminations forming the bars are placed.

The bar series 14 is connected to the bar series 16, which is directly secured to the spider 17, by the annular plate 72. The spiders 17 and 23 are preferably curved in cross section so that the spider hubs may occur conveniently within the frame of the machine, thereby producing a compact construction. The spiders and the side of the frame 2 which contains the bearing 21 are made of non-magnetic material, such as brass, so that the magnetic flux will travel in its proper path.

In this machine, since the rotating field has a higher angular velocity than the field element, in one case thirty-five thirds higher and in the other case thirty-two thirds higher, the maximum angular velocity of the driven shaft is three thirty-fifths or three thirty-seconds of the angular velocity of the armature, depending upon the direction of rotation of the driven shaft with respect to the armature. The speed of the driven shaft may be varied from zero to near synchronism in either direction, for a constant speed of rotation of the armature. The torque of the driven shaft at near synchronism is approximately eleven times the torque of the armature shaft. The highest possible torque that the driven member is able to develop is maintained over the entire range of speed from zero to near synchronism in either direction at a very high efficiency on account of the fact that all of the energy is consumed in the machine and is not dissipated in external resistances, that is, all of the energy of the driver is transmitted to the driven element at all speeds of operation except such portion of the energy as is required to cover the losses in the machine.

When it is desired to obtain a speed of the driven element in excess of the speed of the driving element, that shaft 57 may constitute the driving shaft and shaft 8 the driven shaft, in which case the speed of shaft 8 may approach at its maximum thirty-five thirds or thirty-two thirds of the speed of shaft 57, depending upon the direction of rotation of shaft 8 with respect to shaft 57.

Figure 9:
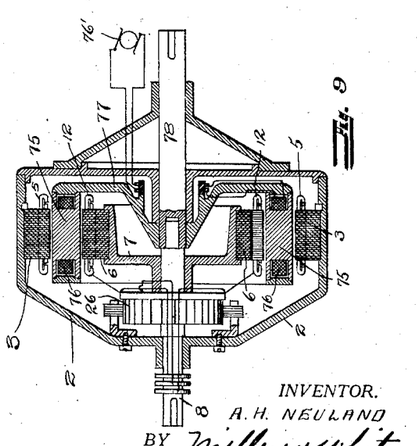
Fig. 9 is a section of a machine embodying another form of the invention.
Figure 10:
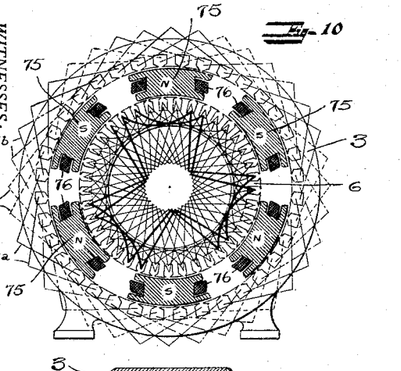
Fig. 10 is a cross-section of the machine shown in Fig. 9, the armature and stator windings being shown diagrammatically.

In the construction shown in Figs. 9 and 10 I have provided a machine in which at synchronism the driven shaft rotates at the same angular velocity as the driving shaft. In this construction the field has the same angular velocity as the field element, in contradistinction to the construction heretofore described in which the field has a different angular velocity than the field element. In the construction shown in Figs. 9 and 10 it may be stated that the field element is the field. The armature and stator in this construction are wound in the same manner as in the machine previously described, and the currents and windings may be controlled and varied as heretofore described, to produce different angular velocities of the driven shaft with respect to the drive shaft.

The field member comprises a plurality of pole pieces 75, and the windings are arranged to conform to the number of pole pieces employed, in the present instance there being six poles and six pole windings. Each pole piece 75 is surrounded by a field or magnetizing winding 76, the windings being arranged to produce the proper polarity. The windings are energized from a source of direct current $76^1$ which is connected by brushes to slip rings in the rotative spider 77 of the field member, with which slip rings the field windings 76 are connected, as shown in Fig. 9. The pole pieces 75 are arranged intermediate of the concentric armature and stator and are secured to the spider or disk 77 which is secured to the shaft 78. Since the field rotates at the same angular velocity as the field member, the speed of the field member may be varied from zero to near synchronism with the speed of the armature. Reversal of direction of rotation of the driven element is produced by introducing the current into the stator windings in such a way as to bring about the torque between the stator windings and the field in opposition to that torque which exists between the armature and the field, as has been heretofore described.

Figures 11, 12, 13:
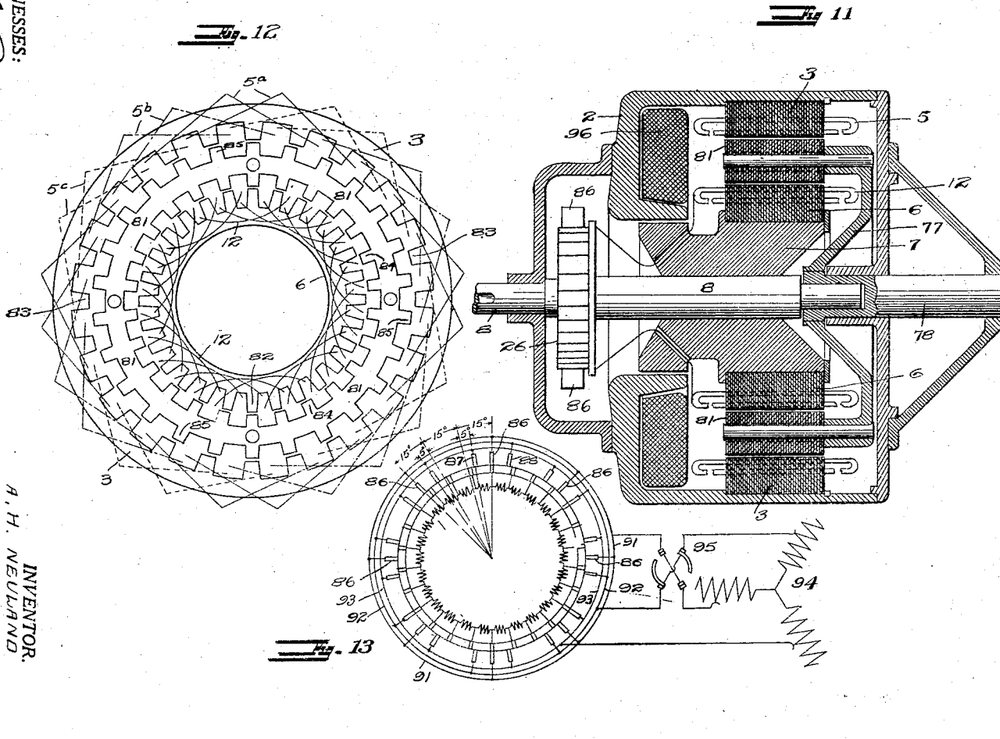
Fig. 11 is a section of a machine embodying another form of the invention.
Fig. 12 is a cross section of the machine shown in Fig. 11, the armature and stator windings being shown diagrammatically.
Fig. 13 is a diagrammatic representation of the electric circuits of the machine shown in Fig. 11.

In Figs. 11, 12 and 13 I have shown another form of the invention in which the field element consists of a single rotatable member. In this construction I employ an armature 6 which is provided with a multiple winding. The winding is connected to the commutator 26 by suitable leads or taps and the commutator brushes are connected to the windings on the stator 3, the windings on the stator being arranged for a three phase current. Thus, the current generated in the armature is conducted into the stator windings and produces a torque between the stator and the field element 81. In this construction, the armature 6 is provided with a plurality of evenly spaced teeth or projections 82, between which the turns of the coils 12 are arranged. The stator is also provided with a plurality of evenly spaced teeth or projections 83, between which the turns of the coils 5 are arranged. The number of teeth on the stator differs from the number of teeth on the armature as will be hereinafter explained.

Arranged between the concentric stator and armature is the rotatable field element 81 which comprises a laminated ring having a plurality of evenly spaced teeth or projections 84 on one side facing the teeth on the armature and preferably an equal number of evenly spaced teeth 85 on the other side facing the teeth 83 on the stator. The number of teeth 84 or 85 on the field element differs from the number of teeth on the armature and from the number of teeth on the stator, so that the teeth 82—84 are alined at one or more portions and more or less staggered at the intermediate portions, and the teeth 83—85 are alined at one or more portions and more or less staggered at the intermediate portions. In the present illustration I have employed twenty-four stator teeth 83, twenty-six field element teeth 84 and 85 on each side of the field element, and twenty-eight armature teeth 82. This arrangement produces two portions of alinement between teeth 82 and 84 and two portions of alinement between the teeth 83 and 85. Assuming for the instant that the field element is held stationary and the armature rotated, disregarding for the present the stator and stator windings, a current of twenty-six cycles per revolution of the armature will be generated in the armature winding. Since there are twenty-six teeth 84 on the field element and twenty-eight teeth 82 on the armature there is produced two alined tooth portions and two intermediate non-alined tooth portions between the armature and the field element, the two alined portions being 180° apart. The teeth on the armature and field element are progressively more and more non-alined between the alined portions and the portions at right angles thereto, at which latter portions they are in complete staggered relation. It will be seen that upon rotation of the armature a distance equal to one tooth pitch on the armature, the alined portion is gradually shifted around the circumference of the rotor for an angular distance of 180°, thereby causing the movement of the path of least magnetic reluctance for one-half a complete revolution for every angular movement of the armature for one tooth pitch, or in other words, the magnetic path between the field element and armature makes one complete revolution for each movement of the armature through twice a tooth pitch. Since the number of teeth on the armature is greater than the number on the field element, the rotation of the flux path is in the same direction as that of the armature. Thus, the rotation of the armature produces a revolving magnetic field. Each revolution of the magnetic field induces two complete cycles in the armature windings, and since the field travels in the same direction as the armature the windings on the armature, since they follow the progression of the field, are cut by the revolving field only twenty-six times for each revolution of the armature, instead of twenty-eight times; or in other words, there are twenty-six cycles of current induced in the windings for each revolution of the armature. The number of cycles per revolution of generated current in the windings is equal to the number of teeth on the armature minus the number of alined portions in which the field rotates in the same direction as the armature, or in other words, the number of cycles per revolution is equal to the number of teeth on the field element or the member which carries no winding. The armature is wound for as many poles as there are alined and non-alined portions. In the present instance there are two alined and two non-alined portions, and hence the armature has a four pole winding.

The commutating mechanism of this machine is substantially that patented in my prior Patent No. 1,178,455, and is illustrated diagrammatically in Fig. 13. Connected to the armature winding is the commutator 26, and a direct current will be collected at those brushes which occupy a neutral position on the commutator with respect to the field. There are twenty-six coils in the armature winding and twenty-six segments on the commutator. When a direct current is to be collected the number of brushes which are employed in order to cause the point of contact or commutation to travel in the same direction as the field or the alined portions and at the same angular velocity must be less than the number of segments on the commutator, and the difference in number is determined by the number of alined portions. In the present instance, therefore, twenty-four brushes per lead should be employed, the angular distance between the adjacent brushes being 15°. This arrangement, however, would involve a large number of brushes, and the number of brushes may be decreased by omitting every second and third brush in every group of three brushes as illustrated in Fig. 13, producing a spacing of the brushes belonging to the same sign of 45°, which will bring about substantially the same progression of the point of contact. This arrangement I have adopted and the brushes 86 are spaced apart 45°, and connected to a common lead.

Therefore, as long as the field member is stationary the current at the brushes and in the stator windings will be direct. As soon as the field element begins to follow the armature, the current at the brushes becomes alternating, and the frequency thereof equals 26 cycles for each revolution of the field element. This alternating current causes the poles due to the current in the stator winding to rotate at a velocity which will at all times retain quadrature relation with respect to the flux of the field element.

With the field element rotating, causing a revolving field in the stator, a counter E. M. F. is induced in the stator windings, and since there are twenty-six teeth 85 on the field element and twenty-four teeth 83 on the stator element, the current induced in the stator windings will have twenty-six cycles per revolution of the field element, as has been heretofore described in connection with the armature currents, that is, the number of cycles per revolution generated is equal to the number of teeth on the element which carries no winding.

Since the counter E. M. F. generated in the stator windings has the same frequency as the current generated in the armature windings, the armature current is introduced into the stator windings, where it exerts a torque between the stator and the field element which adds itself to the torque produced between the armature and the field element.

When the field element begins to rotate due to the torque exerted thereon by the armature current, the field and the field element follow the armature, thereby decreasing the generated armature potential proportionately. The moving field causes the current at the brushes to become alternating and causes a progression of the flux with respect to the stator windings, inducing a potential therein which opposes the E. M. F. of the armature. With a given number of turns in series on the armature and on the stator, a certain speed of the field element will bring about a balance between the two opposing potentials, that is, the potential generated in the armature which is introduced into the stator windings and the counter potential generated in the stator windings, and thereby limit the current in the windings. By varying the number of turns in series of the stator winding, a number of steps in the speed of the field element may be obtained above which the speed may not rise.

Due to the fact that the field element consists of a ring having teeth on opposite sides, the same flux is enabled to traverse the armature and stator windings, by passing through the ring from any point at which the teeth on one side are alined to any point at which the teeth on the other side are alined.

The stator is wound for four poles and connected for a three phase current, and the brushes on the commutator have a spacing adapted to collect three phase currents when the field element rotates. The number of brushes in this example, as has been pointed out and as shown in Fig. 13, is only one-third of the full number, and therefore the brushes 87 of one phase are spaced 10° from the brushes 86 on one side and the brushes 88 of another phase are spaced 10° from the brushes 86 on the other side, thus fulfilling the requirements of three phase spacing. The brushes 86 are connected to ring 91, the brushes 87 to ring 93 and the brushes 88 are connected to ring 92. The rings 91—92—93 are connected to the three phases of the stator winding 94 in such manner that the number of turns of the stator winding may be varied, as for example by the controller heretofore described, so that the speed of the field element may be varied. Reversal of direction of rotation of the field element, which is secured to the driven shafts, may be effected by reversing one phase of the stator winding, that is, by reversing two of the leads from the brushes to the stator windings, and for accomplishing this result I have shown a reversing switch 95.

I claim:

1. In a power transmitting apparatus of the induction type, an armature provided with a winding, a stator provided with a winding which is connected to the armature winding by means of stationary brushes, and a rotatable field element in inductive relation to said armature and stator.

2. In a power transmitting apparatus of the induction type, an armature provided with a winding, a stator provided with a winding, means comprising a commutator and stationary brushes connecting said windings to allow the current generated in the armature winding to flow into the stator winding, a rotatable field element in inductive relation to said armature and stator, and means for producing a common magnetic flux traversing said armature, field element and stator.

3. In a power transmitting apparatus of the induction type, an armature provided with a winding, a concentric stator provided with a winding which is connected to the armature winding through a commutator and stationary brushes, a rotatable field element arranged concentrically between said armature and stator, and means for producing a common magnetic flux traversing said armature, field element and stator.

4. In a power transmitting apparatus of the induction type, an armature provided with a winding, a stator provided with a winding which is connected to the armature winding by means of a commutator and stationary brushes, and a field element adapted to rotate in either direction with relation to the direction of rotation of the armature arranged in inductive relation to said armature and stator.

5. In a power transmitting apparatus of the induction type, an armature provided with a winding, a stator provided with a winding which is connected to the armature winding by means of a commutator and stationary brushes, a rotatable field element in inductive relation to said armature and stator, and means for varying the speed of said element independently of the speed of the armature.

6. In a power transmitting apparatus of the inductor type, an armature provided with a winding, a stator provided with a winding which is connected to the armature winding by means of a commutator and stationary brushes, a rotatable field element in inductive relation to said armature and stator, and means for reversing the direction of rotation of the field element with relation to the direction of rotation of the armature.

7. In a power transmitting apparatus of the induction type, a rotatable current generating element, a stationary current consuming element to consume the current generated in the rotatable element, a rotatable field element in inductive relation to said generating and consuming elements, and means including stationary brushes for varying the frequency of the current supplied to the consuming element.

8. In a power transmitting apparatus of the induction type, a rotatable current generating element, a stationary element arranged to consume the current generated in said rotatable element, means for transferring current between said elements comprising a commutator and stationary brushes, a rotatable field element in inductive relation to said generating and consuming elements, and means for varying the counter electromotive force in said consuming element whereby the speed of the field element is varied.

9. In a power transmitting apparatus of the induction type, a rotatable current generating element, a stationary element including a winding arranged to consume the current generated in said rotatable element, means for transferring current between said elements comprising a commutator and stationary brushes, a rotatable field element in inductive relation to said generating and consuming elements, and means for changing the relation of the current in said consuming element with respect to the field element comprising a switching mechanism for changing the relation between said stationary brushes and said winding whereby the direction of rotation of the field element is reversed.

10. In a power transmitting apparatus of the induction type, an armature provided with a winding, a stator provided with a winding which is connected to the armature winding, a rotatable field element in inductive relation to said armature and stator, means for reversing the direction of rotation of the field element with relation to the direction of rotation of the armature, and means for varying the angular velocity of the field element with relation to the angular velocity of the armature.

11. In a power transmitting apparatus of the induction type, a rotatable current generating element, a stationary current consuming element, means comprising a commutator and stationary brushes for transferring current between said elements, a rotatable field element arranged in inductive relation to said generating and consuming elements, and means for producing a common magnetic flux traversing said generating consuming and field elements.

12. In a power transmitting apparatus of the induction type, an armature provided with a winding, a stator provided with a winding which is connected to the armature winding by means of a commutator and stationary polyphase brushes, a rotatable field element in inductive relation to said armature and stator, means for producing a common magnetic flux traversing said armature, field element and stator, and means for varying the number of turns in series in the stator winding.

13. In a power transmitting apparatus of the induction type, an armature provided with a winding, a stator provided with a polyphase winding which is connected to the armature winding by means of a commutator and stationary polyphase brushes supplying said stator with polyphase currents, whereby a rotating field is produced in the stator, a rotatable field element in inductive relation to said armature and rotating in electrical synchronism with said stator field, means for producing a common magnetic flux transversing said armature, field element and stator means, and means for reversing the direction of rotation of the stator field whereby the direction of rotation of the field element is reversed.

14. In a power transmitting apparatus of the induction type, an armature provided with a winding, a commutator connected to said winding, stationary brushes engaging said commutator, a stator provided with a winding, conductors connecting the brushes with the stator winding, a rotatable field element in inductive relation to said stator and armature, and means for producing a common magnetic flux traversing said armature, field element and stator.

15. In a power transmitting apparatus of the induction type, an armature with a winding, a commutator connected to said winding, stationary brushes engaging said commutator, a stator provided with a winding, conductors connecting the brushes with the stator winding, a rotatable field element in inductive relation to said armature and stator, and means for producing a common magnetic flux traversing said armature, field element and stator, the current at the brushes being direct when the field element is stationary and alternating when the field element rotates.

16. In a power transmitting apparatus of the induction type, an armature provided with a winding, a commutator connected to said winding, stationary brushes engaging said commutator, a stator provided with a winding, conductors connecting the brushes with the stator winding, a rotatable field element in inductive relation to said armature and stator, and means for varying the number of turns in series in the stator winding.

17. In a power transmitting apparatus of the induction type, an armature provided with a winding, a commutator connected to said winding, stationary brushes engaging the commutator, a stator provided with a winding, conductors connecting the brushes with the stator winding, a rotatable field element in inductive relation to said armature and stator, means for producing a common magnetic flux traversing the armature, field element and stator, and means for varying the speed of the field element with relation to the speed of the armature.

18. In a power transmitting apparatus of the induction type, an armature provided with a winding, a commutator connected to said winding, stationary brushes engaging the commutator, a stator provided with a winding, conductors connecting the brushes with the stator winding, a rotatable field element in inductive relation to said armature and stator, means for producing a common magnetic flux traversing said armature, field element and stator, and means for adjusting the voltage relation between the armature and stator whereby a plurality of different substantially constant speeds of rotation of the field element are produced for a constant speed of the armature.

19. In a power transmitting apparatus of the induction type, an armature provided with a winding, a stator provided with a winding which is connected to the armature winding, a rotatable field element in inductive relation to said armature and stator, means for producing a common magnetic flux traversing said armature, field element and stator, and means for producing a plurality of different substantially constant speeds of rotation of the field element at varying loads for a constant speed of the armature.

20. In a power transmitting apparatus of the inductor type comprising an outer stationary member provided with a winding, an intermediate rotatable member, a driven shaft connected to said intermediate member, an inner rotatable member provided with a winding, a driving shaft connected to said inner member, means for producing a common magnetic flux traversing said three elements, rotation of said inner element serving to generate a current in the winding thereon, and means comprising a commutator and stationary brushes for conducting the current generated to the winding on the outer element.

21. An electrical apparatus of the type having a rotatable armature including a winding and a commutator and stationary brushes wiping the commutator and a rotatable field member in inductive relation to the armature, characterized by the fact that the armature is the primary member and is driven at any predetermined fixed speed by external power and that the field member is rotatable, whereby, as the speed of the field member increases from standstill to maximum, the current at the brushes changes from a zero frequency and maximum voltage to a maximum frequency and zero voltage, and a motor element including a winding fed by said variable frequency currents.

In testimony whereof, I have hereunto set my hand at San Francisco, California, this 1st day of August, 1914.

ALFONS H. NEULAND.

In presence of—
H. G. Prost,
G. S. Donelin.

Copies of this patent may be obtained for five cents each, by addressing the "Commissioner of Patents, Washington, D. C."